United States Patent [19]

Milnes

[11] Patent Number: 4,576,273
[45] Date of Patent: Mar. 18, 1986

[54] OPTICAL CARD AND CARD READER SYSTEM FOR PURCHASE OF PARKING TIME

[76] Inventor: Arthur G. Milnes, 1417 Inverness Ave., Pittsburgh, Pa. 15217

[21] Appl. No.: 619,609

[22] Filed: Jun. 11, 1984

[51] Int. Cl.$^4$ .............................................. G07F 1/06
[52] U.S. Cl. ........................... 194/209; 194/DIG. 22; 235/489; 368/90
[58] Field of Search ....................... 368/7–9; 235/489; 194/4 R, 9 R, 9 T, 11, DIG. 22

[56] References Cited

U.S. PATENT DOCUMENTS

| | | | |
|---|---|---|---|
| 3,457,391 | 7/1969 | Yamamoto | 194/4 R |
| 3,688,088 | 8/1972 | Brown et al. | 235/489 |
| 3,998,307 | 12/1976 | Kolben et al. | 194/4 R |

FOREIGN PATENT DOCUMENTS

| | | | |
|---|---|---|---|
| 1786634 | 12/1976 | Fed. Rep. of Germany | 235/489 |
| 181874 | 10/1957 | Sweden | 235/489 |
| 880111 | 10/1961 | United Kingdom | 194/4 |

Primary Examiner—Bernard Roskoski
Attorney, Agent, or Firm—Buell, Ziesenheim, Beck & Alstadt

[57] ABSTRACT

A card-operated parking system utilizes cards having a succession of discrete filtered light transmitting areas thereon. The cards operate a card reader which includes a light source and light sensing means, between which the card is inserted, and a punch which punches out a filter area after it has triggered the time-dispensing mechanism. The filters transmit light having a photon energy below a level characteristic of the filter material but absorb light having a photon energy above that level. Two light sensors are positioned in the light path, one receptive to light of the first mentioned photon energy and the other to light of the second photon energy. Only the outputs corresponding to filtered light trigger the parking time dispensing mechanism. The light source may be a tungsten filament bulb or a pair of light emitting diodes of different photon energies. The light sensing means may be a pair of photodiodes or a pair of phototransistors.

9 Claims, 9 Drawing Figures

OPTICAL CARD AND CARD READER SYSTEM FOR PURCHASE OF PARKING TIME

FIELD OF THE INVENTION

This invention relates to card-controlled apparatus for dispensing services. It is more particularly concerned with parking meters which dispense parking time in response to the introduction of a card-like ticket into the meter, the ticket having optically absorbing regions thereon. My invention is also applicable to automatic laundries, photocopiers, and vending machines of other descriptions for dispensing services.

BACKGROUND OF THE INVENTION

My invention will be described hereinafter with reference to parking meters but it will be understood that such use is exemplary only.

At present almost all parking meters controlling the use of positions in automobile parking lots are coin-operated and mechanical in nature. In recent years there has been an increase in the cost of such parking to the point where quarter-dollars may be the only accepted coin and a spell of one or two hours of parking time may require the provision of many such coins. This presents an availabilty problem that is a growing source of inconvenience to frequent users of such meters. Attempts have been made therefore to devise credit card related systems to operate parking meters.

One approach is the use of a conventional bank credit card, or Visa or Mastercharge card, to purchase a magnetically encoded parking card entitling the purchaser to a number of units, for example 20 hours, of parking time (see for instance Kenyon UK Patent Application No. 2027965A). The parking card could be dispensed from a bank money dispensing machine or from an adjacent stand-alone dispensing machine after a standard bank credit card, or Visa or Mastercharge card, had been temporarily magnetically encoded to allow dispensing of the parking card. The parking card could then be carried in a purse or wallet and used in the parking location. Typically a card with magnetic regions recorded as on an audio cassette tape must be scanned by a reading head at a known speed and this entails problems of cost and reliability. Some applications of magnetic cards involve reading of the card's magnetic regions, and change of certain of the magnetic regions to correspond to the amount of service supplied. Then the cash value is subtracted from the purchased value of the card and the card imprinted with the unused value remaining. This requires a complicate mechanical mechanism and an associated sophisti ated electrical system. An example of such a system m y be found in Pfost et al., U.S. Pat. No. 4,020,325.

Because of the high cost, such systems have not come into general use in connection with parking meters. It is conceivable that such a system might be set up as a single unit to supply parking time to a large array of individual parking meters, which would distribute the cost. It could dispose coin-like parking tokens that could then be used as substitutes for coins in regular parking meters. However many street areas have parking meters in widely dispersed locations not conveniently serviced by a central token dispenser. The need, therefore, exists for a low-cost box unit that could be added to an existing parking meter post to provide parking time with the aid of a low-cost card. The electrical power requirement of each box should be low enough to be provided by battery rather than 60 Hz electrical power line.

In the present state of the art of magnetically encoded cards, it is difficult to apply them economically to parking control. My invention makes use of encoded cards of special design that are interrogated by light of suitably chosen photon energies to achieve parking control at considerably lower cost.

SUMMARY OF THE INVENTION

The principal object of the present invention is to provide apparatus for the purchase of parking time with a card system that is an alternative to the need to supply coins for parking meter operation.

The card itself is a wallet-size parking card that is pre-purchased and entitles the holder to a number of units of parking time determined by optically filtering components on the card. These components become deactivated by change in optical transmission as use of the card proceeds. Finally, all the parking has been consumed and a new card must be purchased. The deactivation is accomplished in the card reader by means which punch a hole in the filtering region when the user is setting up a visible signal flag showing the parking time he desired to purchase.

My card reader positions a card as above-described with a discrete light filter between a light source and two light sensors both of which are in the light path. The filter transmits light having a photon energy below a predetermined level but absorbs light having a photon energy above that level. One light sensor is receptive to light of the first mentioned photon energy and the other to light of the second photon energy. The electrical output of the light sensors corresponding to filtered light is, respectively, high (one) and low (zero). The respective outputs corresponding to the unfiltered light are both high. Those outputs are introduced into a logic circuit which triggers the service dispensing means only when filtered light is received and also triggers a punch which, after the service is dispensed, punches out the discrete light filter so that the filter unit is deactivated.

It is envisaged that the pre-purchasing of the parking card of this system may be accomplished at many locations in shops and stores or through the mail. A particularly convenient method may be through the use of money dispensing machines presently installed outside most banks. The user would insert his banking card, or Visa or Mastercharge or similar card, into the machine and following an instruction code indicate his wish to purchase a parking card say for $10.00. His bank account would be debited $10.00 plus a service charge and a temporary magnetic code would appear on his credit card. This credit card would then be inserted in a parking card dispenser and the parking card received and the temporary magnetic code representing the enabling action would be erased. At a later stage it is envisaged that some bank money dispensing machines would be modified to allow direct dispensing of the parking cards.

DESCRIPTION OF PREFERRED EMBODIMENT

Figure 1:
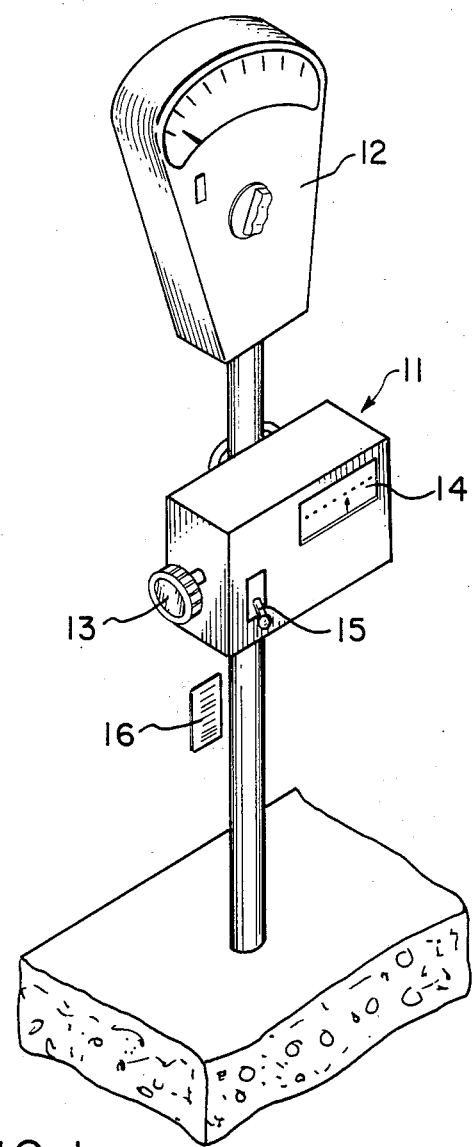
FIG. 1 is an isometric of my apparatus mounted on a conventional parking meter standard.

FIG. 1 shows the card reader box 11 of my invention mounted on the standard of a conventional parking meter 12. On one side of box 11 is a knob 13 which may be rotated to advance the card into the box and to select the desired parking interval. That interval is displayed by indicator 14 which is coupled to knob 13 as will be shown hereinafter. A lever 15 is mounted on one face of box 11 to set up parking time and actuate a punch as described hereinafter. The card 16 of my invention is inserted through a slot in box 11 which may be in any side thereof. In FIG. 1 the slot is in the bottom and is not shown.

Figure 2:
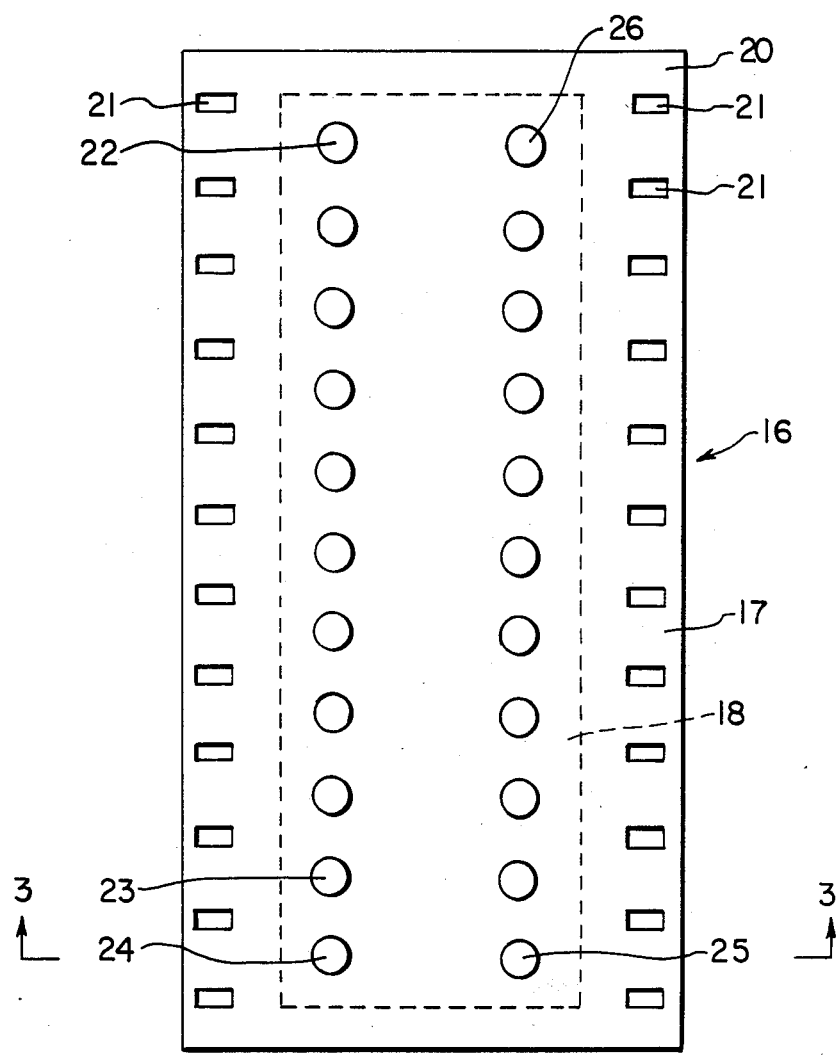
FIG. 2 is a plan of a preferred form of a card of my invention.

FIG. 2 is the top view of a parking card or token 16 that is approximately the length of a dollar bill so that it will fit conveniently in a wallet or purse.

The card comprises a substrate 17 formed with a series of discrete light filtering areas 22–26 inclusive. Those areas may be set in holes in an opaque substrate 17 or the light filtering areas may be printed on a substrate 18 at least semi-transparent to light of infra-red energy down to photon energies of 0.7 electron volts. Ordinary high quality semi-transparent drafting paper for engineering drawings has suitable light transmitting properties. Likewise, a wide range of plastic materials such as cellulose acetate, cellulose triacetate, polyvinyl chloride, polyethylene terphthalate (polyester), and trademarked products such as Mylar and Saran wrap may be used.

Figure 3:
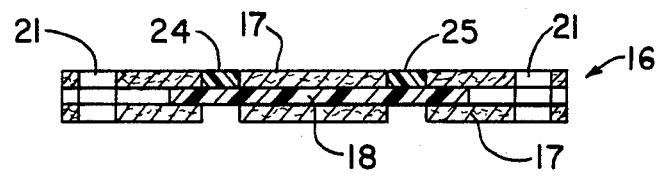
FIG. 3 is a cross section of the card of FIG. 2 taken on the plane 3—3.

The card 16 is formed with a series of uniformly spaced perforations 21 along each side that aid its insertion in the parking meter box 11, as will be described hereinafter. Printed on the top side of the card (or on a plastic insert 18 on the card) is a series of light filtering regions shown as 22, 23, 24, 25, and 26 in FIG. 2. These filter regions may be typically 0.2 to 0.5 inches in diameter and of thickness typically 0.002 inches. They are made typically of powdered crystalline silicon, of semiconductor purity and lightly doped, embedded in a matrix of glue, epoxy or plastic material to produce a solid that does not transmit light of photon energy greater than 1.1 electron-volts (eV) but that is transparent to light photons of energy less than 1.1 electron-volts for reasons that will be explained hereinafter. The matrix is selected to provide ease of application and good adhesion. With a choice between two matrices that are equal in these respects, the material with a refractive index that reduces the scattering of the light within the silicon-containing layer is preferred. This filtering action comes about because silicon in crystalline silicon form has an energy gap of 1.1 eV and absorbs and converts to heat only photons of this energy or greater. Photons of lower energy are transmitted without being absorbed. FIG. 3 shows a cross section of a portion of the card with the plastic insert 18 sandwiched between two substrate layers 17 that form the card 16. The thickness of an absorbing region such as 22 is non-critical, being typically in the range 0.001 inches to 0.010 inches, the only requirement being that light of photon energy greater than 1.1 eV is attenuated by a factor of 50 or more in passing through the region and that light of photon energy less than 1.1 eV is not attenuated by a factor greater than about 5. The average diameter of the grains of powdered crystalline silicon should be such that there are many overlapping grains in the thickness of the filter. A typical size is 5 micrometers diameter. FIG. 2 shows two rows of filter regions. Regions 22, 23, and 24 in the first row are used in sequence with the card inserted in box 11 with end 20 foremost. After all the regions up to 24 in this row are used the card is withdrawn and reinserted with the other end foremost so that regions 25 and its corresponding row can be used in sequence.

Figure 4:
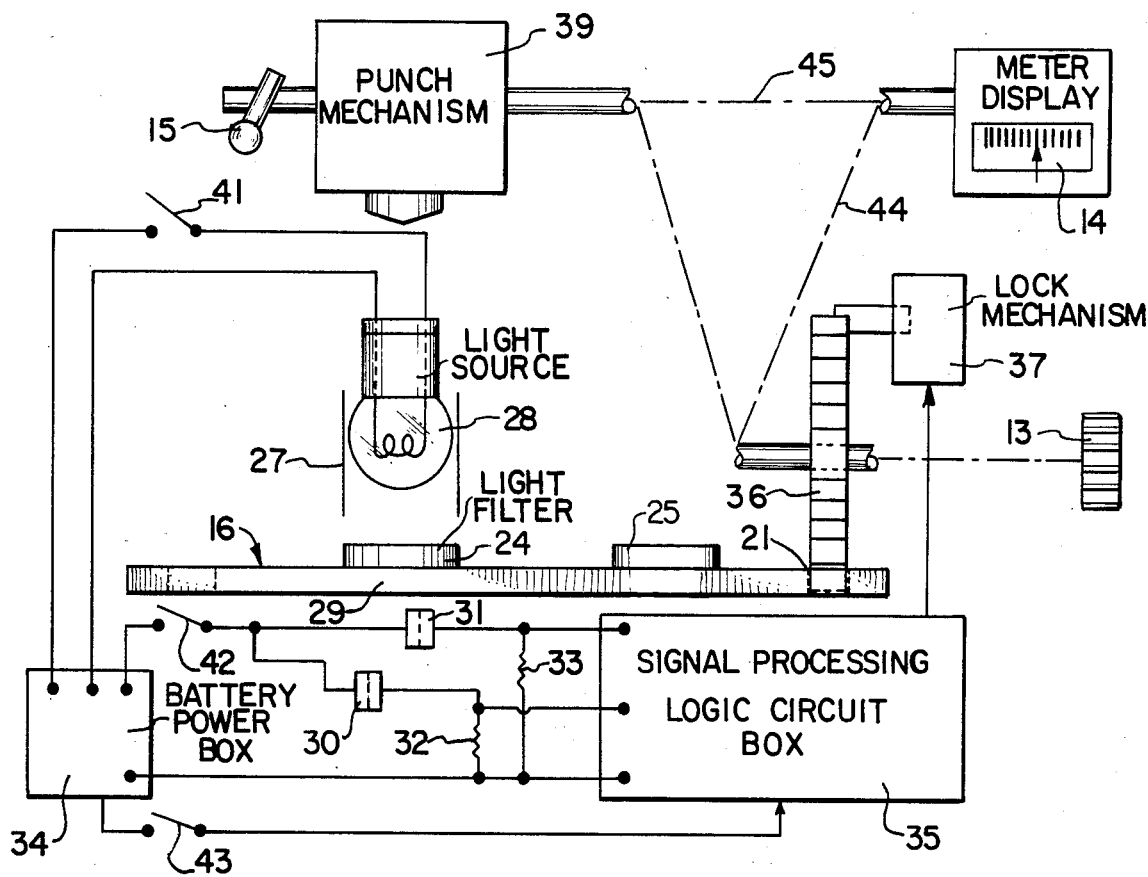
FIG. 4 is a schematic of my card reading apparatus showing a card in end elevation.

FIG. 4 is a schematic of my card reading apparatus where the card 16 is transparent in region 29 without the use of a plastic insert. The light filter region 23 under interrogation is positioned below a light source 28 that may be an ordinary tungsten filament flashlight bulb, so as to be illuminated thereby. The light is screened from the rest of the card by a cylindrical opaque metal or plastic screen 27. The lightbulb is energized by battery power box 34 through switch 41 that is closed by manual insertion of the card 16 by rotation of knob 13. Also activated by insertion of the card are the sensing circuit diodes 30 (germanium) and 31 (silicon) through switch 42 and the signal processing logic circuit box 35 and lock mechanism 37 through switch 43. Lightbulb 28 may be operated at reduced voltage to conserve power. Knob 13 and toothed wheel 36, meter display 14, the lever 15 and punch mechanism 39 are mechanically coupled. Lock mechanism 37 prevents forward rotation of toothed wheel 36 once a valid filter spot is in position under source 28 in the absence of a signal from logic circuit box 35. Depressing the lever 15 unlocks the mechanism 37 and sets up one unit of parking time on the display 14 and advances the card one sensing region and punches a hole in the filter region that has just been interrogated and used.

Figure 5:
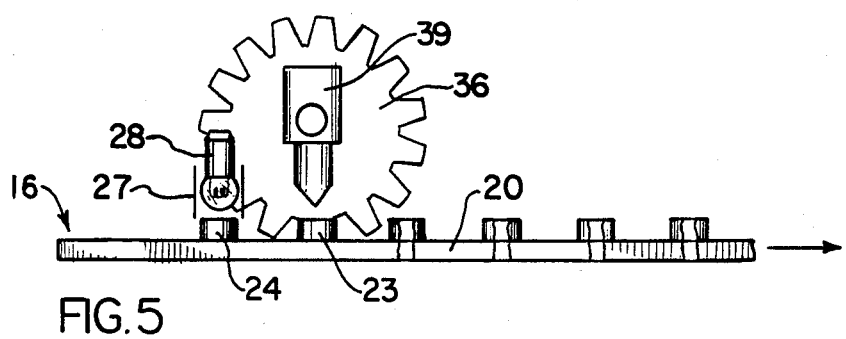
FIG. 5 is a side elevation of a portion of the apparatus of FIG. 4.

The output of light sensing diode 30 is applied across resistor 32 to one input of logic circuit box 35. The output of light sensing diode 31 is applied across resistor 33 to the other input of logic circuit box 35. The output of that circuit is connected to latch mechanism 37. The teeth of wheel 36 mate with perforations 21 along the sides of card 16. Meter display 14 is coupled to knob 13 and toothed wheel 36. Also coupled to those elements is lever 15 and punch mechanism 39 which, as is best shown in FIG. 5, is positioned over card 16 aligned with the row of filter areas so as to be immediately above the filter area interrogated—area 23—after service has been dispensed and card 16 advanced one position in the direction of the arrow. Punch mechanism 39 is positioned so that when it is operated by depression of lever 15 it punches out the filter material area immediately below it.

Figures 6, 7:
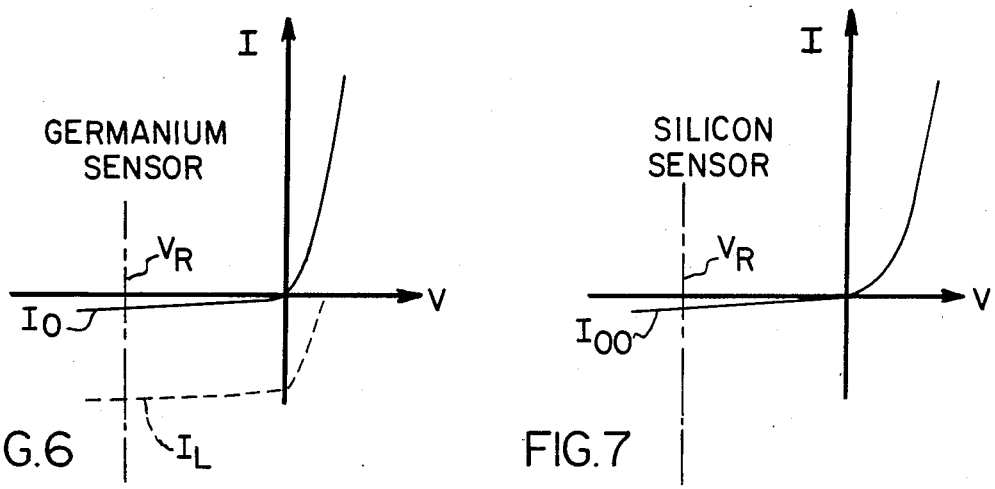
FIG. 6 is an explanatory diagram of the current versus voltage response of the sensing diode made of germanium shown as 30 in FIG. 4, with light photons of energies greater than 0.7 eV applied.
FIG. 7 is an explanatory diagram of the response of a silicon diode shown as 31 in FIG. 4 showing no response if the photon energies are between 0.7 eV and 1.1 eV.
Figure 8:
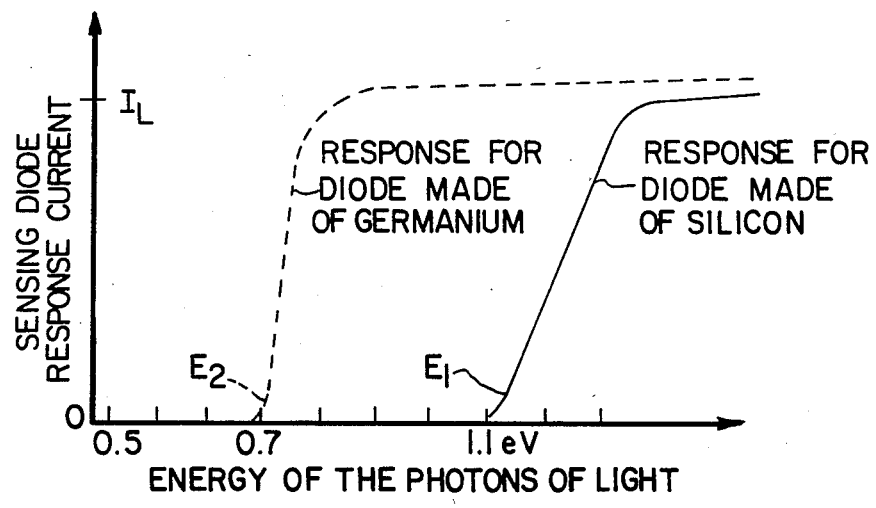
FIG. 8 is a comparative diagram of response of germanium and silicon diodes for a range of photon energies.

The operation of my apparatus will be explained by assuming that all the optical filter regions in the row 22 up to 23 have already been deactivated by the punch mechanism 39. Filter region 23 is the next valid region and is located under the light source 28. Since the silicon powder filter region 23 is intact the only light that passes through it has photon energies less than 1.1 eV. This light falls on both the germanium diode sensor 30 and on the silicon diode sensor 31 each of which contains a pn rectifying junction indicated schematically by the dotted line. Both sensors are reverse biased with a voltage $V_R$, typically 5 volts, as shown in FIGS. 6 and 7. The response currents of these two kinds of diodes are shown in FIG. 8. The germanium diode 30 provides reverse current output for light of photon energies between 0.7 eV and 1.1 eV whereas the silicon diode 31 provides no output for this band of photon energies. The result, therefore, of illumination through the filter spot 23 is that the current through the germanium sensor 30 rises as shown by $I_L$ in FIG. 6 and an increased voltage appears across the resistor 32. The current $I_{oo}$ in FIG. 7 for the silicon diode sensor 31 however remains low and so therefore does the voltage across resistor 33. The logic circuit box interprets this as the presence of a valid filter spot. This locks the insertion knob 13 and the toothed wheel 36 so that the user knows that a valid region has been located under the light spot. The user then begins to depress the lever 15. The first part of the lever travel releases the lock mechanism 37 on the toothed wheel mechanism 36 and advances the card one further filter spot distance. The second part of the lever movement sets up one unit of parking time on the meter display 14 via the geared linkage indicated by the dotted line 44 and also actuates the punch mechanism 39, via linkage 45, to pierce the filter spot 23 that is now conveniently located under the punch, as shown in FIG. 5, and not under the light source 28.

This completes one unit of parking display. If a further unit of time is required the user depresses the lever 15 once more and a reading is now made of the next filter spot 24 and a fresh cycle begins. The display meter winds back mechanically as for a normal meter as parking time elapses. The card 16 is withdrawn from the parking box 11 by reverse rotation of knob 13 since the locking mechanism 37 allows reverse rotation.

If the card has been withdrawn and is reinserted with filter spot 22 already perforated by a previous use, then because of the hole the light entering the sensing diode 31 has photons of energy greater than 1.1 eV and hence the current through the diode is increased and the voltage across resistor 33 is increased. This is interpreted by the logic circuit box 35 as an indication that the card must be advanced a further step by knob 13 in search of a valid (unused) filter spot.

Figure 9:
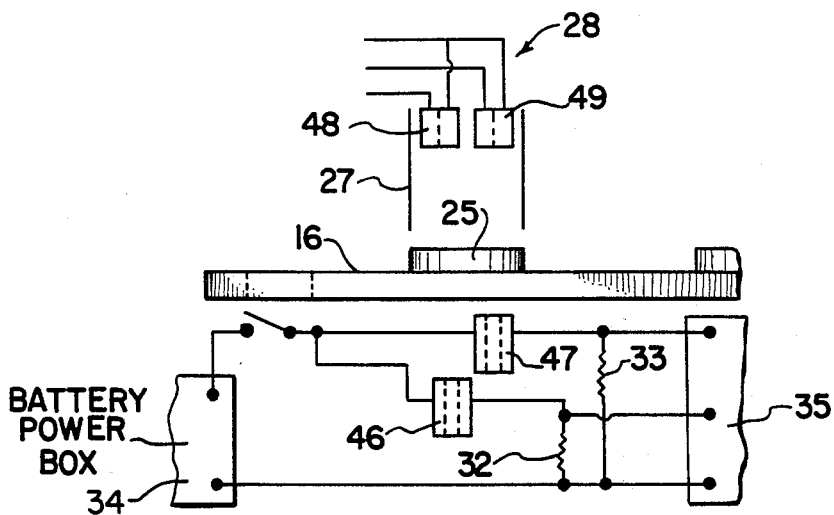
FIG. 9 is a portion of the schematic of FIG. 4 but with light-emitting diodes used as a light source and with photosensitive transistors used in place of photo diodes.

There are several ways by which the ruggedness and sensitivity of the system may be increased. One is by coating the filter spots with a transparent lacquer to prevent the filter spots from being abraded when the card is being carried in a purse or wallet. The sensitivity may be increased by the use of bipolar photosensitive transistors of germanium 46 and silicon 47 in place of the diodes 30 and 31, respectively, as is shown in FIG. 9 where the two dotted lines indicate the emitter and collection junction regions. Phototransistors when operative with the base open-circuited as shown in FIG. 9 have an inherent current gain that is not present in diodes. Another way of adjusting sensitivity is by adjusting the composition of the filter spot to minimize reflectance by choosing a matrix of suitable refractive index and to maximize the transmission of the photons having energies between 0.7 and 1.1 eV. One way of adjusting the optical transmissibility cutoff of the filter spot material is by adding to the crystalline silicon powder a very small percentage of powder of another semiconductor such as Ge or InP (bandgap 1.2 eV).

Likewise, the light source 28 may consist of a pair of light emitting diodes, 48 and 49, one of GaP emitting green light at 2.1 eV photon energy and one of GaAs emitting infrared light of photon energy 1.4 eV, as is also shown in FIG. 9. The filter region 25 may then be powdered semiconductor crystalline CdSe (bandgap 1.7 eV) in a matrix as described previously. Other possibilities for the filter material in this illustration would be the semiconductors $Al_{0.2}Ga_{0.8}As$ or $GaAs_{0.7}P_{0.3}$ since both of these have bandgaps of about 1.7 eV. The detector 30 in FIG. 4 used in this example could then be either a Si or a Ge diode since both materials respond to light of the GaAs photon energy 1.4 eV that is transmitted by the filter. The photon detector 31 in FIG. 4 that must respond to the 2.1 eV green light in the event that the filter spot 25 has been punctured, then has to be a diode with the absorption edge ($E_1$ in FIG. 8) located above 1.7 eV, the filter cut off energy, and below 2.1 eV the photon energy of the light. Diodes made of $GaAs_xP_{1-x}$ where x is between 0.35 and 0.45 have the desired characteristics. So do diodes made of $Al_{0.35}Ga_{0.65}As$ since both have energy bandgaps of about 1.8 eV.

The most convenient and economical way of applying the filter material is a painting or printing process. This has the advantage of being a low temperature process. However, other processes such as sputtering or evaporation or vapor deposition known to those experienced in silicon processing may be used.

It is not essential that the filter spot be made of silicon or CdSe. More generally, the essential feature is that if the two detectors used have energy sensitive cliffs at $E_1$ and $E_2$ as shown in FIG. 7, then the filter used must cut off photons of energy greater than $E_1$ and be transparent to photons of energy between $E_1$ and $E_2$. Certain metallic or organic dye chemicals may be found that exhibit photon pass characterictics that meet this criterion. Infra-red transmitting visible absorbing filters that could be used are described by Macleod in *Thin-Film Optical Filters*, American Elsevier Publishing Company, 1969, page 56, et seq.

Other pairs of photo sensors that could be used would be InP (1.2 eV) and Ge (0.7 eV), GaAs (1.45 eV) and Si (1.1 eV), GaAs (1.45 eV) and Ge (0.7 eV), to give a few examples from the wide range that might be possible. These have been chosen from the list of semiconductors given in Table 4.2 of the book, *Semiconductor Devices and Integrated Electronics*, by A. G. Milnes, published by Van Nostrand Reinhold, 1980. This book explains the differences between phototransistor and photodiode sensitivity on page 772.

The choice of the filter material characteristics make it very unlikely that an unethical user could find some commonly available material with equivalent optical filtering action. From FIGS. 4 and 5 it is seen that the punchhole is substantial in relation to the size of the filter spot with the result that cutting up residual filter material from an old card to patch a used area is not practical. The punched hole is also, of course, a convenience feature for the user of the card since it clearly indicates how much has been used.

While I have shown and described a present preferred embodiment of my invention and have illustrated a presently preferred method of practicing the same, it is to be distinctly understood that the invention is not limited thereto but may be otherwise variously embodied within the scope of the following claims.

I claim:

1. An automatic system for dispensing services controlled by cards carrying successively positioned individual light filters comprising a card reader including a light source, light sensing means positioned to receive light from said light source, means successively positioning said card in said reader to station each said individual light filter between said light source and said light sensing means, means actuated by the output of said light sensing means for triggering said dispensing means to dispense a predetermined quantum of services in response to the light transmitted by said individual light filter, and disabling means triggered by the output of said light sensing means for altering the light-transmitting characteristics of said light filter after the predetermined quantum of services has been dispensed, to prevent reuse of said filter in said card reader.

2. The system of claim 1 in which the individual light filters transmit light photons below a photon energy characteristic of the light filter material but absorb light photons above that energy.

3. The system of claim 2, in which said light sensing means comprise first and second means, the first light sensing means being sensitive only to light photons above said characteristic photon energy and the second light sensitive means being sensitive to light photons above a photon energy less than said characteristic photon energy.

4. The system of claim 3 in which said first and second light sensing means are photodiodes.

5. The system of claim 3 in which said first and second light sensing means are phototransistors.

6. The system of claim 2 in which the light source comprises a pair of light-emitting diodes, one emitting light photons above said characteristic photon energy and the other emitting light photons above a photon energy less than said characteristic energy but below said characteristic photon energy.

7. The system of claim 4 in which the light filter material is essentially powdered crystalline silicon, the first light sensing photodiode is essentially a silicon photodiode and the second light sensing diode is essentially a germanium photodiode.

8. The system of claim 5 in which the light filter material is essentially powdered crystalline silicon, the first phototransistor is essentially a silicon phototransistor and the second phototransistor is essentially a germanium phototransistor.

9. The system of claim 1 in which the means for altering the light-transmitting characteristic of said filter comprise a punch positioned to punch a hole in said filter.

* * * * *

UNITED STATES PATENT AND TRADEMARK OFFICE
CERTIFICATE OF CORRECTION

PATENT NO. : 4,576,273
DATED : March 18, 1986
INVENTOR(S) : ARTHUR G. MILNES

It is certified that error appears in the above-identified patent and that said Letters Patent is hereby corrected as shown below:

Column 6, line 47, "Optical Filters" should be italicized.

Signed and Sealed this

Fifteenth Day of July 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,576,273

DATED : March 18, 1986

INVENTOR(S) : ARTHUR G. MILNES

It is certified that error appears in the above-identified patent and that said Letters Patent is hereby corrected as shown below:

```
Column 1, line 51, change "complicate" to --complicated--;
line 52, change "sophist ated" to --sophisticated--; line 53,
change "m y" to --may--.
```

(This will apply to the Grant Only).

Signed and Sealed this

Twenty-eighth Day of October, 1986

[SEAL]

*Attest:*

DONALD J. QUIGG

*Attesting Officer*     *Commissioner of Patents and Trademarks*